US012775925B2

(12) United States Patent
Blotenburg

(10) Patent No.: US 12,775,925 B2
(45) Date of Patent: Oct. 27, 2026

(54) SYSTEM FOR PROCESSING TRANSACTIONS AND METHOD OF OPERATING

(71) Applicant: Wincor Nixdorf International GmbH, Paderborn (DE)

(72) Inventor: Jan Blotenburg, Randstad (NL)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 68 days.

(21) Appl. No.: 18/676,560

(22) Filed: May 29, 2024

(65) Prior Publication Data

US 2025/0371512 A1 Dec. 4, 2025

(51) Int. Cl.

*G06Q 20/20* (2012.01)
*G06Q 20/40* (2012.01)
*G06Q 30/0226* (2023.01)
*G06Q 30/0238* (2023.01)

(52) U.S. Cl.

CPC ........... *G06Q 20/20* (2013.01); *G06Q 20/401* (2013.01); *G06Q 30/0226* (2013.01); *G06Q 30/0238* (2013.01)

(58) Field of Classification Search

CPC .. G06Q 20/20; G06Q 20/401; G06Q 30/0226; G06Q 30/0238; G06Q 20/202; G06Q 20/387; G06Q 30/0207–0277
USPC ............................................. 705/14.1–14.73
See application file for complete search history.

(56) References Cited

U.S. PATENT DOCUMENTS 11,138,584 B1 * 10/2021 Catoe ................... G06Q 20/208
2017/0054726 A1 * 2/2017 Friedmann .......... H04L 63/0428
2021/0035086 A1 * 2/2021 Khan .................. G06Q 20/204
2021/0073766 A1 * 3/2021 Gonzales ........... G06Q 20/3276
2023/0120798 A1 * 4/2023 Palande ................ G06V 10/25 705/23
2023/0139491 A1 * 5/2023 Paul .................. G06F 16/90335 726/1
2023/0229670 A1 * 7/2023 Ranjan ................ G06F 16/1844 707/615

(Continued)

OTHER PUBLICATIONS

Joshua Griffin, "What is a point of sale (POS) system, and how does it work?", retrieved from https://www.north.com/blog/what-is-a-point-of-sale-pos-system, available on Sep. 24, 2019 (Year: 2019).*

*Primary Examiner* — Sam Refai
(74) *Attorney, Agent, or Firm* — Black McCuskey

(57) ABSTRACT

A system for processing transactions can include a point of sale ("POS") device, a payment server, a device monitoring server, a customer engagement server, a checkout assistance server, and a Harmonized Identity Management ("HIDM") server. The POS device can transmit data associated with a transaction to gain approval of the transaction from the payment server. The device monitoring server can monitor and optimize the performance of the POS device. The customer engagement server can advance a promotion, track a loyalty plan, and distribute coupons and vouchers based on the data associated with the transaction. The checkout assistance server can reduce shrinkage associated with unexpected items in a bagging area near the POS device. The HIDM server can receive requests for authorization tokens from the other servers and provide the tokens.

18 Claims, 4 Drawing Sheets

(56) References Cited

U.S. PATENT DOCUMENTS

| | | | | |
|---|---|---|---|---|
| 2024/0012834 | A1* | 1/2024 | Terborg | G06F 11/3419 |
| 2025/0165474 | A1* | 5/2025 | Chalasani | G06F 16/24552 |

* cited by examiner

SYSTEM FOR PROCESSING TRANSACTIONS AND METHOD OF OPERATING

BACKGROUND

1. Field

The present disclosure relates to systems for processing financial transactions and methods for operating such systems.

2. Description of Related Prior Art

U.S. Pub. No. 2015/0134953 discloses a METHOD AND APPARATUS FOR OFFERING CLOUD-BASED HSM SERVICES. A HSM service controller receives an administrative request to enable a cloud-based application to have access to a cloud-based HSM service. The HSM service controller segments a cloud based HSM into a plurality of VHSMs. The HSM service controller allocates to the cloud-based application, a source VHSM from among the plurality of VHSMs. The source VHSM includes an initial set of credentials, roles and/or metadata. The HSM service controller stores a handle for the source VHSM in association with a handle for the cloud-based application. The HSM service controller routes cryptography requests between the cloud-based application and the VHSM based on the handle for the source VHSM and the handle for the cloud-based application. The HSM service controller receives one or more management requests from the cloud-based application and executes cloud administrator functions responsive to the management request.

U.S. Pub. No. 20080301049 discloses a Transaction Management System. The transaction management system includes a plurality of individually identifiable secure container holding facilities constituted by cash acceptance terminals located at the premises of participating merchants and a plurality of individually identifiable secure containers or cash containers, each adapted to dock with and un-dock from a cash acceptance terminal. The merchants, in each transaction, deposit transaction documents such as money, cheques, credit card vouchers or the like into the secure container within the cash acceptance terminal. Cash money fed into the cash acceptance terminal is scanned, validated and counted into the secure container. The cash acceptance terminals include data entry facilities by means of which data pertaining to transactions is recorded in the cash acceptance terminal. The secure containers and the cash acceptance terminals are adapted for bidirectional communication and the data recorded in the cash acceptance terminal is communicated to the secure container. The transaction management system includes a central server in communication with the data processing system of a number of financial institutions. The cash acceptance terminals are programmed to communicate with the server. Purchasers are able to use the cash acceptance terminals as banking facilities and, using a cash acceptance terminal with a facility to recirculate and to dispense cash, the system may be programmed to allow the cash acceptance terminals to dispense cash and credit value, thereby allowing a purchaser to use a cash acceptance terminal like an automated teller machine (ATM) to draw cash, to transfer money between accounts, for bill payment or the like. Using an appropriate tracking and scheduling system, the central server is programmed to record the identity and location of each cash acceptance terminal and every secure container in the system as well as the monetary value stored in or to be obtained from each cash acceptance terminal and secure container in the system which enables the system operator and participating financial institutions to manage the flow of cash within the system without necessarily routing each cash consignment through a cash processing centre or financial institution. The transaction management system is essentially a cash bank with a cash repository that is not constituted by a conventional vault, but by a virtual repository constituted by the secure cash acceptance terminals and secure containers that are all tracked and audited by the system.

U.S. Pub. No. 2022/0393863 discloses ENTANGLED LINKS, TRANSACTIONS AND TREES FOR DISTRIBUTED COMPUTING SYSTEMS. An entangled links mechanism establishes and maintains bipartite temporal intimacy between pairs of computers, using an idempotent, reversible token method which presents no observable external "change" until a communication of information needs to occur between the computers, and which maintains the potential for "bounded (or unbounded) reversibility" in case the intended information dispatched by a source computational entity is not captured or properly accepted by a destination computational entity. The mechanism enables distributed computers in a network to remain continuously aware of each other's presence; to communicate on a logically nearest neighbor basis in a secure and reliable manner in which packets passed over these links do not conflict with normal traffic or cause the available resources of the link to be exceeded; and that atomicity, consistency, isolation, and "reversible durability" may be maintained for transactions when perturbations occur.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

This section provides a simplified summary in order to provide a basic understanding of some aspects described herein. This summary is not an extensive overview and is not intended to identify "key" or "critical" elements of the present disclosure or to delineate the scope of the various aspects described herein. The purpose of this portion of the document is to present some concepts in a simplified form as a prelude to the more detailed description that is presented later.

A system for processing transactions can include a point of sale ("POS") device, a payment server, a device monitoring server, a customer engagement server, a checkout assistance server, and a Harmonized Identity Management ("HIDM") server. The POS device can be configured to transmit data associated with a transaction to gain approval of the transaction initiated by a customer. The payment server can be configured to communicate with the POS device during a completion of the transaction over a network. The payment server can also be configured to receive the data associated with the transaction. The payment server can also be configured to transmit approval of the transaction to the POS device over the network. The device monitoring server can be configured to communicate with the POS device over the network. The device monitoring server can also be configured to monitor the performance of the POS device. The device monitoring server can also be configured to optimize the performance of the POS device. The customer engagement server can be configured to communicate with the POS device during the completion of the transaction over the network. The customer engagement server can also be configured to receive data associated with the transaction. In response to receiving the data, the customer engagement server can also be configured to advance at least one promotion to a customer requesting the transaction. The customer engagement server can also be configured to track a loyalty plan with rewards associated with the customer. The customer engagement server can also be configured to distribute at least one of a coupon and a voucher based on the data associated with the transaction. The checkout assistance server can be configured to communicate with the POS device during the completion of the transaction over the network. The checkout assistance server can also be configured to reduce shrinkage associated with unexpected items in a bagging area near the POS device. The HIDM server can be configured to receive respective requests for authorization tokens from all of the payment server, the device monitoring server, the customer engagement server, and the checkout assistance server. Each of the authorization tokens can provide access to protected resources. The HIDM server can also be configured to provide the authorization tokens in response to the respective requests.

BRIEF DESCRIPTION OF THE DRAWINGS

The detailed description set forth below references the following drawings.

DETAILED DESCRIPTION

Figure 1:
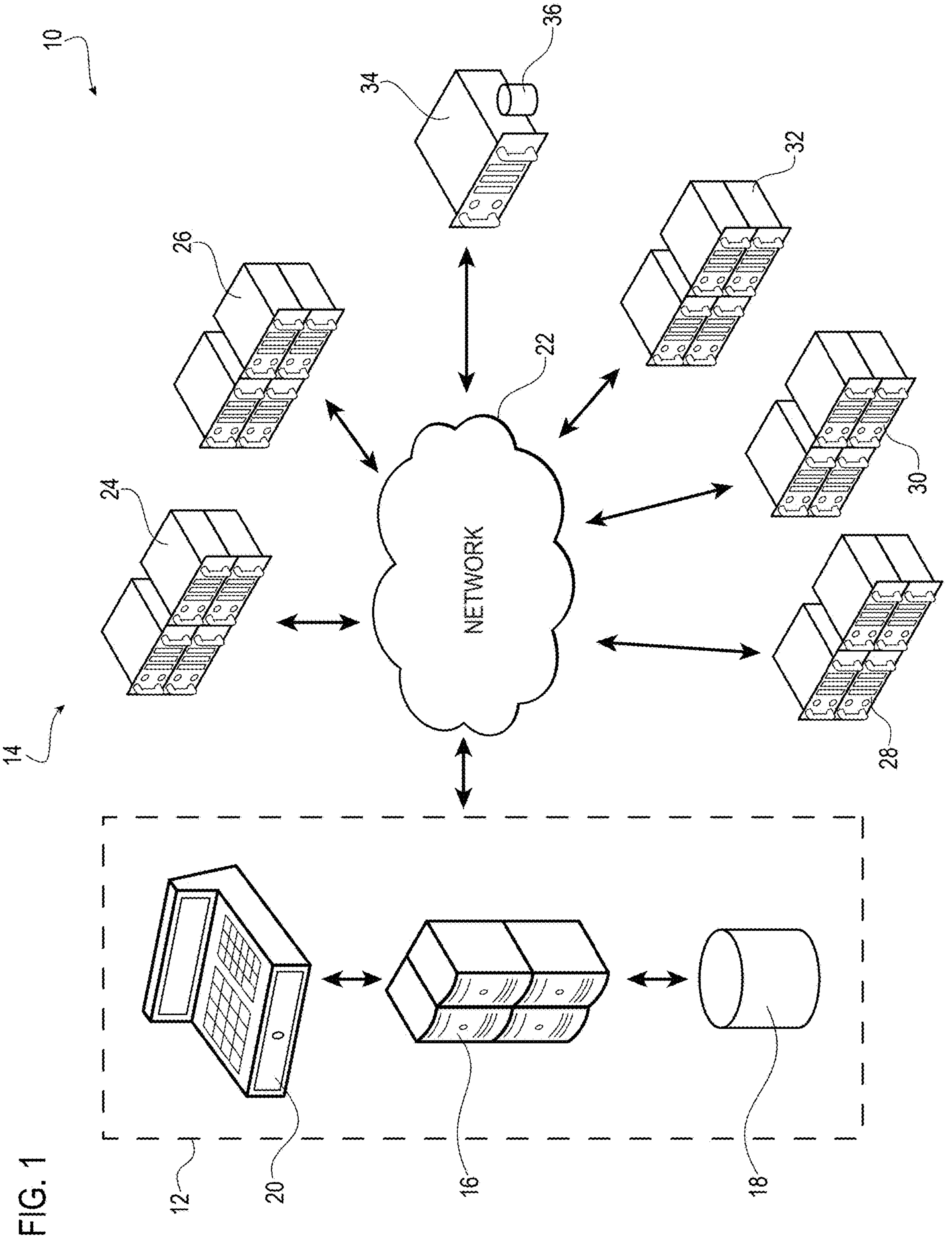
FIG. 1 is a schematic of a system for processing transactions according to an exemplary embodiment of the present disclosure.

The present disclosure, as demonstrated by the exemplary embodiment described below, can provide a Harmonized Identity Management (HIDM) service. The HIDM service is a cloud-native, common identity management solution that is intended to be utilized by a plurality of other applications and solutions that a business entity uses in operation. The HIDM service is multi-application enabled, which means, in a system that includes the HIDM service, the HIDM service provides a single source of truth for user data across a plurality of other applications for a given business entity (also referred to as a "tenant"). Further, in one or more embodiments of the present disclosure, the HIDM service can be configured, by way of software and/or hardware, to provide service to a plurality of tenants.

The HIDM service can include one or more service components or applications or "apps" stored and executed by an HIDM server. The HIDM service can also include one or more databases. The HIDM service can also include a user interface and several cloud-deployed containerized services, also referred to as "docker containers." The HIDM service can have multiple services along with a web-based application for management.

The HIDM service can provide a single source of truth for managing a business unit hierarchy for a business enterprise. The HIDM service can utilize industry standard OAuth2/OIDC protocols to provide access to as well as protect resources. The HIDM service can enable local account validation for offline access. The HIDM service can provide a fine-grained permission grouping and role allocation. The HIDM service can permit offline authentication and authorization support for connected systems. Users and consumers of the HIDM service can include entities in retail management, point of sale ("POS").

The HIDM service can, on a high level, enable enterprises to manage multiple applications and each application can be associated with a set of users. These users can have different roles or permissions at different levels of the enterprise or business unit hierarchy in different applications. Thus, the HIDM service can provide complete flexibility in controlling the authentication and authorization of access to various resources.

Generally, OAuth2/OIDC provides an enterprise with "secure delegated access" to server resources on behalf of the owner of the resources. It specifies a process for resource owners to authorize third-party access to their server resource without providing credentials. OAuth2/OIDC is designed specifically to work with Hypertext Transfer Protocol (HTTP) and essentially allows access tokens that are to be issued to third party clients by an authorization server, with the approval of the resource owner. The third party then uses the token to access the protected resource(s) hosted by the resource server.

OAuth2 is directly related to OIDC (OpenID Connect) since OIDC is an authentication layer built on top of OAuth2.0. It uses a tokenization system where a third-party service can make requests to the application on behalf of a user. The authentication information like credit card number, security code and consumer name are each given token IDs. These tokens are given to the third-party service instead of the actual data. Once the authentication tokens are verified the application only shares the information authorized by the user.

The HIDM service includes the features/functionalities of protecting resources, authenticating users using a local account storage or with the help of an external identity provider, providing session management and single sign-on, managing and authenticating clients, issuing identity and access tokens to clients (which can be other applications), validating tokens, using multi-factor authentication, providing multi-tenant and external authentication support, providing OAuth2.0 authorization code flow support (client credentials and AuthCode with proof key for code exchange (PKCE)), and providing roles and permissions for data management.

FIG. 1 schematically shows an operating environment, referenced at 10, in which transactions are communicated and processed. The transactions can be financial and/or commercial. An exemplary business enterprise is referenced at 12. A system for processing transactions that are generated by the business enterprise 12 is referenced at 14.

The exemplary business enterprise 12 includes a computing device having one or more processors in the form of a server 16. The exemplary server 16 may in some embodiments be implemented using one or more networked computers or other electronic devices, whether located locally with respect to one another or remotely with respect to one another. The exemplary server 16 can include a central processing unit (CPU) including at least one microprocessor coupled to a memory, which may represent the randomaccess memory (RAM). The exemplary server 16 can include one or more interfaces/transceivers for interconnecting one or more networks (e.g., a LAN, a WAN, a wireless network, and/or the Internet, among others) to permit the communication of information to other computing devices. The exemplary server 16 can operate under the control of an operating system, kernel and/or firmware and can execute or otherwise rely upon various computer software applications, components, programs, objects, modules, data structures, etc.

The exemplary business enterprise 12 also includes a database 18. The exemplary database 18 can include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 170. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The exemplary business enterprise 12 also includes a point of sale ("POS") device 20. The exemplary POS device 20 can include a terminal that sits beside the cash register to process credit and debit cards and/or gift cards. The exemplary POS device 20 can also or alternatively be defined as the terminal through which a sale is completed, such as having a display screen, a card reader, a bar and/or quick response ("QR") code scanner, a cash drawer, and a wired or wireless transceiver. The exemplary POS device 20 is configured to transmit data associated with each transaction to the server 16 for storage in the database 18. The exemplary POS device 20 can also transmit data associated with each transaction away from the business entity 12, to gain approval of a transaction. The exemplary POS device 20 can be a desktop system that operates on a computer connected to a cash drawer, a barcode scanner, and a card swiper. The exemplary POS device 20 can be a mobile system, such as operating on a tablet or a smartphone that attaches to a card reader or includes a card reader. The exemplary POS device 20 can be a self-service kiosk system.

The exemplary POS device 20 itself can communicate with other computing devices that are physically remote from the business entity 12 or can communicate with physically remote computing devices through the server 16. It is noted that lines having arrowheads at both ends represent lines of communication. Communications with physically remote computing devices can be completed over a network 22 of the operating environment 10. The exemplary network 22, that is illustrated schematically, can include a local area network (LAN), a wide area network (WAN) such as the Internet, a multi-protocol label switching (MPLS) network, a cellular network such as operated by cellular phone companies, or any combination thereof. The exemplary network 22 can be practiced with a wireless network, a hard-wired network, or any combination thereof. The exemplary network 22 can be, in part, a financial switching/bank network such as NYCE, PULSE, PLUS, Cirrus, AFFN, Interac, Interswitch, STAR, LINK, MegaLink, or BancNet. The present disclosure is well suited to a wide variety of computer network systems over numerous topologies. Within this field, the configuration and management of large networks comprise storage devices and computers that are communicatively coupled to dissimilar computers and storage devices over a network.

The exemplary operating environment 10 includes a payment platform service executed/implemented by a payment server 24. The exemplary payment server 24 can be programmed/configured to communicate with the server 16 and/or POS device 20 during the completion of a transaction over the network 22 and at other times if desired. The payment server 24 can be programmed/configured to provide a single connection for the business enterprise 12 to communicate with multiple third-party financial guarantors (banks, providers of credit, etc.) and technologies for completing payments for transactions.

The exemplary operating environment 10 also includes a device monitoring service executed/implemented by a device monitoring server 26. The exemplary device monitoring server 26 can be programmed/configured to communicate with the server 16 and/or POS device 20 during the completion of a transaction over the network 22 and at other times if desired. The exemplary device monitoring server 26 can be programmed/configured to monitor and optimize a network operating within the business enterprise 12 and devices operating on the network operating within the business enterprise 12, including the POS device 20. The exemplary device monitoring server 26 is thus configured to communicate over the network 22 with any device operating on the network operating within the business enterprise 12, including the POS device 20. The exemplary device monitoring server 26 can be programmed/configured to include and execute tools that improve the efficiency of devices operating on the network operating within the business enterprise 12, including the POS device 20. The exemplary device monitoring server 26 can also be programmed/configured to provide secure access to any such devices by management of the business enterprise 12 for assessment and monitoring. The exemplary device monitoring server 26 can also be programmed/configured to monitor a device with an IP address, including postal, restaurant and gas stations as well as printers, cameras and counting machines. The exemplary device monitoring server 26 can also be programmed/configured to report any incidents involving devices and deploy new software and software updates for devices operating on the network operating within the business enterprise 12, and log/journal file handling.

The exemplary operating environment 10 also includes a customer engagement service executed/implemented by a customer engagement server 28. The exemplary customer engagement server 28 can communicate with the server 16 and/or POS device 20 during the completion of a transaction over the network 22 and at other times if desired. The exemplary customer engagement server 28 can be programmed/configured to receive data associated with transactions and advance promotions to customers, track customer loyalty plans and rewards, and distribute coupons and vouchers based on the transaction data.

The exemplary operating environment 10 also includes a checkout assistance service executed/implemented by a checkout assistance server 30. The exemplary checkout assistance server 30 can communicate with the server 16 and/or POS device 20 during the completion of a transaction over the network 22 and at other times if desired. The exemplary checkout assistance server 30 can be programmed/configured to allow a sales attendant of the business enterprise 12 to help multiple customers at the same time. The exemplary checkout assistance server 30 can be programmed/configured to reduce non-malicious shrinkage by instantly flagging issues such as unexpected items in the bagging area or a mismatch between items scanned and the total weight of items on the security scale. The operation of the exemplary checkout assistance server 30 can allow checkout interventions to be cleared remotely.

The exemplary operating environment 10 also includes a checkout service for a particular industry or market, such as fashion, that is executed/implemented by a specialty checkout server 32. The exemplary specialty checkout server 32 can communicate with the server 16 and/or POS device 20 during the completion of a transaction over the network 22 and at other times if desired. The exemplary specialty checkout server 32 can be programmed/configured to personalize the checkout experience for each customer, can maintain an up-to-date shopping basket across every touchpoint, and maintain an in-store inventory in real-time.

The exemplary operating environment 10 can also include other applications/services that can communicate with the server 16 and/or POS device 20 during the completion of a transaction, and at other times as desired, that are not shown in FIG. 1. By way of example and not limitation, the operating environment 10 can include a service and corresponding server that optimizes cash supply chain management, a service and corresponding server that provides a personal shopper, and a service and corresponding server that provides protection against security intrusions.

According to the present disclosure, the exemplary operating environment 10 also includes an HIDM server 34 and HIDM database 36 executing an HIDM service. The exemplary servers 24, 26, 28, 30, 32 and any other servers providing respective services in the exemplary operating environment 10 are clients of an HIDM service and tenants of the HIDM server 34, as the HIDM server 34 is configured to provide the service of a common identity management solution.

A client can request a token only if it was registered (through create client) with the HIDM server 34. A registered application can have multiple clients, for example, FCx_RetailManagement, FCx_ConfigurationManagement, FCx_POS. Typically the following common settings are defined for a client: a unique client ID; a secret key; an allowed set of interactions with the token service (called a grant type); a web URL where an identity and/or access token is sent to (called a redirect URL); a list of scopes (i.e., resources) the client is allowed to access. The HIDM server 34 is configured to permit a user to perform the following tasks related to clients: creating a client, viewing a client, editing a client, and deleting a client.

Figure 2:
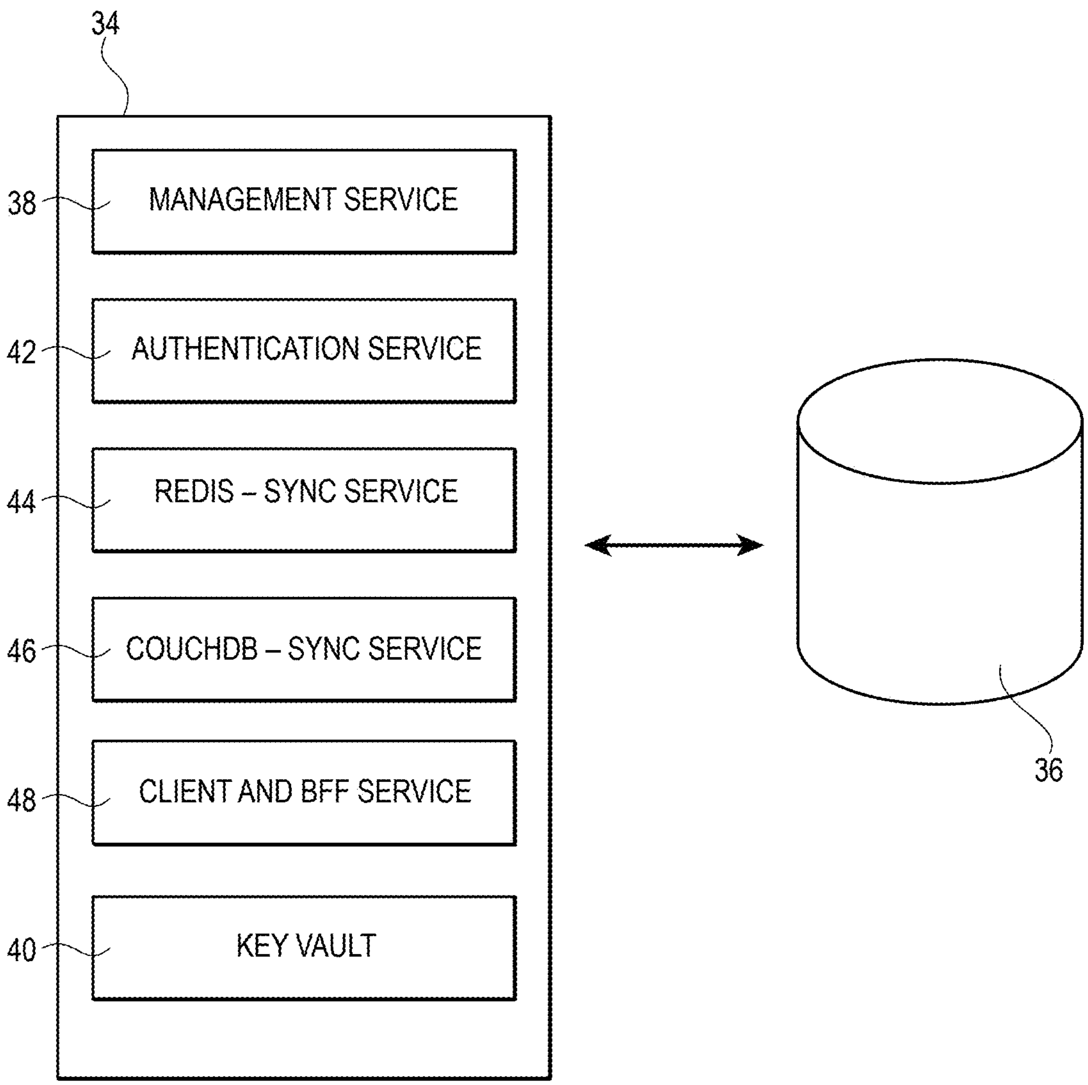
FIG. 2 is a schematic of an identity management server of the system shown schematically in FIG. 1.

As shown in FIG. 2, the exemplary HIDM server 34 includes a management service module 38. The exemplary management service module 38 exposes CRUD APIs (Create, Read, Update, and Delete) (Application Programming Interfaces) for different entities within the HIDM function, the HIDM function provided by the HIDM server 34. By way of example and not limitation, such entities can be defined as a user, a business unit, and a business unit type. The exemplary HIDM service supports multi-tenancy and the exemplary management service module 38 manages the database 36 to provide separate portions of the database 36 for each tenant. The exemplary management service module 38 identifies the correct portion of the database 36 in response to the tenant information that is provided in an incoming user token, the incoming user token used for access to data.

The tenant information contained within an incoming user token for access can be a tenant short name. An end point of the applicable portion of the database 36 and the connection string can be made available from a key vault 40 against the tenant's short name. The key vault 40 can be maintained by the HIDM server 34. The tenant's short name can be passed to another module during a process of authentication service configuration.

The exemplary management service module 38 provides management service for the HIDM service, which is a multi-tenant service. This implies that the HIDM service can cater to multiple tenants. The elements below are used to configure the management service:

| Section | Subsection | Description |
|---|---|---|
| EnableElasticApm | | Enable/Disable Elastic APM |
| ElasticApm | SecretToken | Elastic APM token |
| | ServerUrl | Elastic APM Url |
| | ServiceName | Service Name |
| | Environment | Service Environment |
| | TransactionSampleRate | Sampling rate, should be set to 10% by default |
| | LogLevel | Level of log |
| LogEnricher | Environment | Serilog environment |
| | ServiceName | Serilog service name |
| | ServiceVersion | Serilog service version |
| | ServiceNamespace | Serilog service namespace |
| ConnectionStrings | AzureSqlConnectionString | Azure SQL server connection string |
| PasswordConfig | PasswordWorkFactor | Password work factor |
| | HMACAlgorithmName | Password hashing algorithm |
| | DefaultPasswordExpiryInDays | Default password expiry |
| ODataConfiguration | MaxTop | Maximum allowed records with OData $top query present in URL (Client-side filtering) |
| | PageSize | Maximum allowed records from server when $top is not used (Server-side filtering). |
| IdentityServerConfig | Authority | Authentication service Url |
| KeyVault | MountPoint | KeyVault Mount path |
| | VaultAddr | KeyVault address |
| | VaultRole | KeyVault role |
| | TokenPath | KeyVault token path |

-continued

| Section | Subsection | Description |
|---|---|---|
| Caching | Enabled | Enable caching |
| | SlidingExpiryInSeconds | Sliding expiry time |
| | AbsoluteExpiryInSeconds | Absolute expiry time |
| Swagger | EnableAuthentication | Enable Swagger Authentication |
| | EnableSwagger | Enable Swagger |
| | AuthorizationScopes | Swagger client scopes |
| | ClientId | Swagger client id |
| | ClientSecret | Swagger client secret |

The exemplary HIDM server 34 also includes an authentication service module 42. The exemplary authentication service module 42 exposes openID based end points for authentication. As HIDM service supports multi-tenancy, it provides separate CouchDB databases for each tenant. The exemplary management service module 38 points to the appropriate portion of the database 36 based on the tenant's short name (which is part of the client name), which is then passed as part of the client name. The connection string data for each tenant is stored against the tenant's short name in the key vault 40. Also, the tenant's short name is available as part of the client ID. The user can optionally select a business unit before logging into the application provided by the authentication service module 42. The elements below are used to configure the authentication service provided by the authentication service module 42:

| Section | Subsection | Online/ Offline mode | Description |
|---|---|---|---|
| EnableElasticApm | | Online | Enable/Disable Elastic APM |
| ElasticApm | SecretToken | Online | Elastic APM token |
| | ServerUrl | | Elastic APM Url |
| | ServiceName | | Service Name |
| | Environment | | Service Environment |
| | TransactionSampleRate | | Sampling rate, should be set to 10% by default |
| | LogLevel | | Level of log |
| CouchDbConfig | Server | Both | CouchDB Server Url |
| | Username | | CouchDB Username |
| | Password | | CouchDB Password |
| Certificate | CertificatePath | Both | Identity server certificate path |
| | CertificatePassword | | Identity server certificate password |
| HostConfig | PublicUrl | Both | Authentication service host URL |
| | BasePath | | Authentication service base path |
| PasswordWorkFactor | | Both | Password work factor |
| HMACAlgorithmName | | Both | HMAC Algorithm name |
| KayVault | MountPoint | Online | KeyVault Mount path |
| | VaultAddr | | KeyVault address |
| | VaultRole | | KeyVault role |
| | TokenPath | | KeyVault token path |
| Caching | Enabled | Both | Enable caching |
| | SlidingExpiryInSeconds | | Sliding expiry time |
| | AbsoluteExpiryInSeconds | | Absolute expiry time |
| OperatingMode | | Both | Online/Offline mode When you deploy Authentication service on the Edge server, the operating mode must be set to Offline mode. In case of deployment on the cloud it must be set to Online mode. |
| Environment | | Both | Environment |
| PasswordLockoutPolicy | InitialLockTime | Both | Initial lock time after $1^{st}$ wrong password attempt |
| | AdditionalLockTime | | Additional lock time after $2^{nd}$ wrong password attempt |
| | TemporaryLockTime | | Temporary lock time after $3^{rd}$ wrong password attempt |
| ConnectionStrings | AzureSqlConnectionString | Online | Sql Db connection string |
| LogEnricher | Environment | Both | Serilog environment |
| | ServiceName | | Serilog service name |
| | ServiceVersion | | Serilog service version |
| | ServiceNamespace | | Serilog service namespace |
| | RetainedFileCountLimit | | Maximum files retained before deleting |
| | Path | | File storage path |
| SupportedCultures | | Both | Supported languages |
| DuendeLicenseKey | | Both | license key |

The exemplary HIDM server 34 also includes a Redis-Sync service module 44 for data replication. Redis is a relatively quick, in-memory database and cache that is built in C, with speed prioritized. Redis stands for “Remote Dictionary Server.” The exemplary Redis-Sync service module 44 is deployed as a single instance per tenant. The exemplary Redis-Sync service module 44 is a single-tenant service which implies that when it is deployed to an environment, if there are multiple tenants, it is deployed separately for each tenant. The exemplary Redis-Sync service module 44 takes the tenant’s short name as a parameter during deployment. The same is used as part of the key naming convention applied by the key vault 40. Any change in the authorization data for a particular tenant is replicated to the corresponding tenant specific Redis Instance. An Sql Db connection string and Redis connection string are configured during the deployment. While configuring the HIDM services and its modules, a Redis connection string, a SQL database connection string, and an application polling interval are desirable. The elements below are used to configure the exemplary Redis-Sync service module 44:

| Section | Subsection | Description |
|---|---|---|
| ConnectionStrings | AzureSqlConnectionString | Azure SQL server connection string |
| RedisConfiguration | ConnectionString | Redis connection string |
| RedisSyncConfig | TenantShortName | Unique Tenant Identifier |
| RedisSyncBackgroundServiceConfig | Enabled | Flag indicating if redis sync service is enabled |
| | PollingIntervalInMS | Polling interval for redissync service |
| LogEnricher | Environment | Serilog environment |
| | ServiceName | Serilog service name |
| | ServiceVersion | Serilog service version |
| | ServiceNamespace | Serilog service namespace |
| EnableElasticApm | | Enable/Disable Elastic APM |
| ElasticApm | SecretToken | Elastic APM token |
| | ServerUrl | Elastic APM Url |
| | ServiceName | Service Name |
| | Environment | Service Environment |
| | TransactionSampleRate | Sampling rate, should be set to 10% by default |
| | LogLevel | Level of log |

The exemplary HIDM server 34 also includes a CouchDB-Sync service module 46. Similar to the exemplary Redis-Sync service module 44, the exemplary CouchDB-Sync service module 46 is deployed per tenant, in other words a tenant-specific CouchDB is created per tenant on the CouchDB instance shared across all tenants. The exemplary CouchDB-Sync service module 46 synchronizes tenant specific data from a tenant-specific SQL database to a tenant-specific CouchDB. The connection end points and credentials to connect to tenant-specific CouchDB is passed to a Docker Container via Environment variables during deployment. Any change in data (Authentication or Authorization related) for a given tenant is replicated to the corresponding tenant specific CouchDB. The CouchDB Sync service executed by the exemplary CouchDB-Sync service module 46 is a single-tenant service which implies that when it is deployed to an environment, if there are multiple tenants it is deployed separately for each tenant. In the CouchDB batch size configuration, a packager service creates change packages in the SQL database. A publisher service picks the change packages from the SQL database and publishes them to the CouchDB. The below elements are used to configure the CouchDB Sync service executed by the exemplary CouchDB-Sync service module 46:

| Section | Subsection | Description |
|---|---|---|
| LogEnricher | Environment | Serilog environment |
| | ServiceName | Serilog service name |
| | ServiceVersion | Serilog service version |
| | ServiceNamespace | Serilog service namespace |
| EnableElasticApm | | Enable/Disable Elastic APM |
| ElasticApm | SecretToken | Elastic APM token |
| | ServerUrl | Elastic APM Url |
| | ServiceName | Service Name |
| | Environment | Service Environment |
| | TransactionSampleRate | Sampling rate, should be set to 10% by default |
| | LogLevel | Level of log |

-continued

| Section | Subsection | Description |
|---|---|---|
| ConnectionStrings | AzureSqlConnectionString | Azure SQL server connection string |
| CouchDbConfig | Server | CouchDB Server Url |
| | Username | CouchDB Username |
| | Password | CouchDB Password |
| PackagerConfig | Enabled | Flag indicating if the Packager service is enabled. Default is True. |
| | PollingIntervalInMS | Polling intervals measured in milliseconds. Default is 30000 i.e. 30 seconds. |
| CouchDbSyncConfig | TenantShortName | CouchDB Tenant short name. |
| PublisherConfig | Enabled | Flag indicating if Publisher service is enabled. Default is true. |
| | PollingIntervalInMS | Indicates the polling interval. Default is 30000, i.e., 30 seconds. |
| | BatchSize | Indicates the number of packages to publish in a batch. Default is 20 |
| | FailureRetryLimit | Indicates the number of retries to attempt in case of failure. Default is 3 |
| | FailureWaitForNextRetryInMS | Indicates the wait interval in-between retries. Default is 5000 i.e. 5 seconds |

The exemplary HIDM server 34 also includes a client and backend for frontend (BFF) module 48. The exemplary client and BFF module 48 is a single instance of an HIDM Client and is deployed for multiple tenants. The client is a multi-tenant user interface (UI) component which can cater to multiple tenants. The elements below are used to configure the service provided by the exemplary client and BFF module 48:

| Section | Subsection | Description |
|---|---|---|
| IdentityServerConfig | Authority | Authentication service Url |
| | ClientId | Unique client identifier |
| | ClientSecret | Client secret |
| | Scopes | Applicable scopes |
| | IdentityApplicationId | Unique Application identifier |
| | ManagementUrl | Management service Url |
| | ManagementEndPoints | Management service remote endpoint Uri |
| | ManagementVersion | Management service version |
| LogEnricher | Environment | Serilog environment |
| | ServiceName | Serilog service name |
| | ServiceVersion | Serilog service version |
| | ServiceNamespace | Serilog service namespace |
| EnableElasticApm | | Enable/Disable Elastic APM |
| ElasticApm | SecretToken | Elastic APM token |
| | ServerUrl | Elastic APM Url |
| | ServiceName | Service Name |
| | Environment | Service Environment |
| | TransactionSampleRate | Sampling rate, should be set to 10% by default |
| | LogLevel | Level of log |

The elements below are used to configure a tenant:

| Section | Description |
|---|---|
| ID | Primary key |
| ShortName | Tenant shortname |
| Name | Tenant name |
| Description | Description |
| IsMfaEnabled | Is MFA enabled for the tenant |
| MaxMfaRetryCount | max no of times MFA verification code can be entered incorrectly |
| MaxPasswordRetryCount | max no of times password can be entered incorrectly |
| INSERT INTO [idm] . [Tenant] (Id, Name, ShortName, Description, IsMfaEnabled,MaxMfaRetryCount,MaxPasswordRetryCount) VALUES (1, 'Tenant1','Tenant1', "Tenant 1 description". 1, 5, 5); | |

Code Block 1 Tenant Configuration

The exemplary HIDM server 34 can be deployed as Jenkins job. Jenkins is an open-source automation server that helps developers automatically build, test, and deploy applications. It can be a valuable tool in the software development process, as it helps ensure that code changes do not break the overall system. Jenkins can be used to automate various tasks, such as building, testing, and deploying software. It can also monitor executions, track dependencies, and generate reports. A Jenkins job is a sequential set of tasks that a user defines. It can be a task for building/packaging software, creating artifacts, deploying artifacts, creating help files, or any other automated process implemented in Jenkins. Jenkins compiles the job configuration inside the project workspace to perform the defined steps every time a job is run. In addition, Jenkins integrates with a wide range of other tools and services, making it a powerful and versatile tool for developers. As a result, Jenkins can be applied in deploying the exemplary HIDM server 34 in the operating environment 10 with the exemplary servers 24, 26, 28, 30, 32.

| | |
|---|---|
| 1 | Create AKS, SQL Server etc. |
| 2 | Deploy Common CI-CD Services |
| 3 | Deploy HIDM Database |
| 4 | Deploy HIDM Services |
| | Authentication Service |
| | Management Service |
| | Client + BFF |

-continued

| | |
|---|---|
| 5 | Create Tenant SQL Database |
| | Database will be created by deploying Database Job in AKS |
| | Database Login and User for Tenant would be created |
| 6 | Create Tenant Couch Database |
| | Automatically created by CouchDB.NET |
| | Database creation using Batch Job in AKS to configure cluster mode |
| | User and role creation for a Tenant |
| 7 | Create Tenant Credentials (SQL, CouchDB) in KeyVault |
| 8 | Deploy HIDM Services |
| | CouchDBSync Service |
| | RedisSync Service |
| 9 | Tenant specific data in SQL Database. |
| | Create a default Admin use for HIDM Client login |

The following parameters can be defined in the performance of the steps of the Jenkins job:

| Parameter | Description |
|---|---|
| ARI_NAME | Unique identifier for the environment. ARI_NAME-ENVIRONMENT_NAME-CLOUD_LOCATION will create various Azure resource names and AKS namespaces. E.g. ps-qa1-weu. |
| ENVIRONMENT_NAME | Environment name e.g. dev, QA, prod etc. This field will be concatenated to ARI-NAME and to CUSTOM_DOMAIN. |
| TENANT_NAME | Unique Tenant name for which the deployment will be run. Tenant name must be alphanumeric and its length must be between 4 and 20 characters. This is an Optional parameter. |
| COMMON_DOMAIN | Domain name owned by the client. An FQDN is created from: FRONT_END_SERVICE-PRODUCT-TENANT_NAME-ENVIRONMENT_NAME-CLOUD_LOCATION.COMMON_DOMAIN E.g. pos-fcx-ps-qa1-weu.XXX.nextgen.dieboldnixdorf.com |
| DNS_RG | Azure Resource group managing domains and DNS zones in selected subscription. |
| CLOUD_ACR_NAME | Azure container registry name where-in docker images will be picked up by Kubernetes. |
| COMMON_SSLCERT_VAULT | Azure Vault name from which the wildcard certificate for the entire subscription will be fetched. |
| CLOUD_LOCATION | Azure region e.g. West Europe |
| AKS_CLUSTER_TYPE | Type of AKS cluster public or private |
| ACTION | Indicates the type of deployment. If empty, then only azure environment will be created. If deploy is selected, then Azure environment will be created and services will be deployed. If destroy is selected, then services in Kubernetes will be destroyed. Azure environment is not deleted. |
| RELEASE_ENGAGE | NA |
| DEPLOY_ENGAGE_DEMO_DATA | NA |
| RELEASE_FCX | NA |
| DEPLOY_SFX_DEMO_DATA | NA |
| FCX_FORECOURT | NA |
| RELEASE_CTR | NA |
| RELEASE_HIDM | HIDM version to deploy. If empty, HIDM is not deployed. If version is selected, HIDM services for that version are deployed. |
| RELEASE_CPAAS | NA |
| PROFILE | Profile to be deployed Dev or Prod. |
| ENVIRONMENT_SIZE | Environment size to deploy e.g., S, M, L, etc. |
| SYNCHRONIZE_ACRS | If true, Synchronize the CLOUD_ACR_NAME repository with the products repositories. Only selected product images will be synced. |
| SERVICES | Additional services that need to be deployed. Currently available options are: KRAKEND GRAFANA_PROMETHEUS KIBANA_ELASTICSSEARCH ELASTIC_CLOUD OPENTELEMETRY |
| CLOUD_SUBSCRIPTION_ID | Azure subscription for creating resources. |
| CLOUD_CLIENT_ID | Azure client id for creating resources. |
| CLOUD_CLIENT_SECRET | Azure client secret for creating resources. |

-continued

| Parameter | Description |
|---|---|
| CLOUD_TENANT_ID | Azure AD tenant for creating resources. |
| AKS_CLUSTER_NAME | Enter the name of existing AKS cluster in Azure to connect to it. Leave the field blank to create a new cluster. |
| AKS_CLUSTER_RG | Enter the name of the Resource Group where the AKS cluster already exists. Leave the field blank to create a new RG. |
| ELASTIC_AGENT_ FLEET_URL | Add the Fleet Server URL to enroll the Elastic Agent |
| ENROLMENT_TOKEN | Add the policy token for agent. |

Also, to setup the HIDM server 34 for an enterprise, the list of components set forth below can be first added to the solution:

| Components | Description |
|---|---|
| Applications | For any client to integrate with HIDM, Applications is the first entity that has to be created or registered on HIDM; for example, FCx and Vynamic Engage. Once these applications are created, users can be linked to it with specific Role to log in and get tokens. |
| Clients | Clients represent applications that can request tokens from the Identity Server. A registered application can have multiple clients, for example, FCx_Desktop, FCx_Mobile, etc. Typically the following common settings are defined for a client: A unique client ID. A secret key if requested The allowed set of interactions with the token service (called a grant type). A network location where an identity and/or access token is sent to (called a redirect URL). A list of scopes (i.e. resource) the client is allowed to access. |
| Resource | A resource is any information that has to be protected with Identity Server. It may include identity data of users, or APIs. Every resource has a unique name, and clients use this name to specify the resource they want to get access to. Resource supported by HIDM can be of the following types: Identity Resource is any identity information (claims) about a user, for example, name or email address. API Resource is a unique combination of Verb and Registered Endpoint. Protected Resource is any protected data or functionality. |
| Permissions | HIDM supports Permission Management where permissions can be linked to an API or Function Resource. In HIDM, grouping of permission is also supported. Based on the creation of a single or group of Permissions, they can be linked to roles which are subsequently assigned to Users and Applications to obtain access to the resource. Permissions are created and linked to roles and resource. |
| Roles | Roles are logical grouping of Permissions or groups of Permissions. Roles can be specific to an Application or can be a Global Role, that can consist of Permissions across Applications. Using these roles, a registered user or a client is granted access to a specific resource. |
| Business Units | Business unit types and business units define the Hierarchy of an Enterprise. An enterprise needs to first create all the possible business unit type entities supported and maintain a parent-child relationship, among them, for example, Enterprise → Country → City → Store. Once the required Business unit types are created, the Business unit entity is created in a hierarchal structure using the parent child relationship maintained for a business unit type, for example, Spell → Poland → Katowice → Dollormart. |
| Users | All the applicable users whom an enterprise needs to provide access to its applications are required to be created/registered in this section. This entity deals with user management. During user creation, user can be linked to applicable roles for a particular application and business unit supported. User profiles are created so that access to any protected resource is granted to them. |

servers 24, 26, 28, 30, 32, must be created or registered with the HIDM server 34. Each application should be in an active state for a user in order to be able to log in and use the same.

In one or more embodiments of the present disclosure, when an enterprise sets up the HIDM server 34 for its authentication and authorization purposes, the enterprise must first register and integrate all its tenants, such as the exemplary servers 24, 26, 28, 30, 32, with the HIDM server 34. In the exemplary embodiment, to integrate with the HIDM server 34, the following entity criteria are created as pre-requisites: application, business unit type, and business unit which is linked to a business unit type. Additionally, all the required/desired applications to be utilized by the business enterprise 12, such as those executed by the exemplary Through a user interface defined by the HIDM server 34, the business enterprise 12 can create application(s). The following exemplary code can be applied to by an SQL database associated with the HIDM server 34 to create an application:

```
DECLARE @appId INT
INSERT INTO idm.Application
(Name, Description, IsActive)
VALUES ('HIDM_App', 'Harmonized Identity UI', 1);
SELECT @appId=MAX (Id) FROM idm.Application;
```

The following are details of the various fields:

| Field Name | Description | Required Fields |
|---|---|---|
| Name | Enter the name of the Application. For example: CPaaS<br>The name must be a unique value, i.e. you cannot setup another Application with the same name. | Mandatory |
| Status | Indicates the status of the Application:<br>Active (Default)<br>Inactive<br>You can also set the status of the Application by turning on or turning off the Status: Active toggle on the Preview Card. | Not Applicable |
| Description | Enter a description of the Application. For example: here a description given for CPaaS. | |
| External ID | Enter an External ID.<br>External ID is a reference to a unique ID of the newly added application in an external system.<br>For example, If we are adding the CPaaS application, let us assume CPaaS is already defined in an external application like ERP used by the customer. In this case, the external ID would be the unique ID of CPaaSas defined in the external application. | |

The HIDM server 34 permits the creation of business unit types and business units. Business unit types and business units are the entities that define the hierarchy of the business enterprise 12 in the HIDM server 34. Once all of the applications are registered, all the possible business unit types can be created while maintaining a parent-child relationship among them. For example, a genus "enterprise" can include a species "country," which can include a sub-species "city," which can includes a sub-sub-species "store." Business unit types can be created via a user interface controlled by the HIDM server 34. Business unit types can be defined in a HIDM SQL database as follows:

DECLARE @BUTID INT
INSERT INTO idm.BusinessUnitType
(Name, Description, IsRoot)
VALUES ('Enterpise', 'Enterpise', 1)

SELECT@*BUTID* = MAX(*Id*) FROM *idm.BusinessUnitType*

Once the desired business unit types are created, business unit entities can be created in a hierarchical structure using the parent-child relationship maintained for a business unit type. Business unit entities can be defined in the HIDM SQL database as follows:

DECLARE @BUID INT
INSERT INTO idm.BusinessUnit
(Name, Description, BusinessUnitTypeId, IsActive)

VALUES('DefaultTenant', 'Default Tenant'1, 1);

SELECT @BUTID = MAX(Id) FROM idm.BusinessUnit

Within the exemplary system, "roles" are logical groupings of permissions or groups of permissions. Roles can be specific to an application or can be defined by a global role. A "global role" can consist of permissions across more than one application. Using roles, a registered user or a registered client can be granted access to a specific resource which can be a function or API resource.

Within the exemplary system, API/function resources can be created and can be defined in the HIDM SQL database as follows:

DECLARE @AR1 INT;
INSERT INTO idm.ApiResource
(Name, Description, ApiVerb, ApiRegister, IsActive, ApplicationId)
VALUES ('View campaigns and promotions', 'Read only access to campaigns and promotions.', 'GET', 'GetCampaignAndPromo', 1, null);

select@*AR*1 = MAX(*Id*) FROM *idm.ApiResource*;

Within the exemplary system, permissions and linkings of permissions with resources can be created and can be defined in the HIDM SQL database as follows:

DECLARE @perm INT;
INSERT INTO [hidm-qal-weu-hidm-sqldb].idm.Permission (Name, Code, Description, IsPredefined, ExternalId)
VALUES ('Campaigns and promotions', 'Ma_Campaigns', 'Access to campaigns and promotions', 0, null);

select@*prem* = MAX(*Id*) FROM *idm.Permission*;

INSERT INTO idm.PermissionResource (ApiResourceId, FunctionResourceId, [Type], PermissionId) VALUES (@AR1, null, 2, @perm);

Within the exemplary system, permission groups and linkings of the permission groups with particular permissions can be created and can be defined in the HIDM SQL database as follows:

DECLARE @permgrp1 INT;
INSERT INTO idm.PermissionGroup (Name, Description, ExternalId)
VALUES ('Campaigns', 'Campaigns DESC', null);

select@*permgrp*1 = MAX(*Id*) FROM *idm.PermissionGroup*;

INSERT INTO idm.PermissionGroupPermission (PermissionGroupId, PermissionId) VALUES (@permgrp1, @perm);

Within the exemplary system, roles and linkings between roles and permission groups can be created and can be defined in the HIDM SQL database as follows:

DECLARE @role INT;

INSERT INTO idm.[Role] (Name, Description, IsAdministrator, IsPredefined, IsGlobal, ApplicationId, ExternalId)

VALUES ('StandardUser', 'TRO1_DATA', 1, 1, 0, @appId, null);

$$\text{select}@\text{role} = \text{MAX}(Id)\text{ FROM }idm.Role;$$

INSERT INTO idm.RolePermissionGroup (RoleId, PermissionGroupId) VALUES (@role, @permgrp1);

Within the exemplary system, an "identity resource" can be any identity information (claims) about a user, for example, a name or an email address. The following script can be used for creating an identity resource:

DECLARE @IRId1 INT;

INSERT INTO idm.IdentityResource (Enabled, Name, DisplayName, Description, Show InDiscoveryDocument)

VALUES(1, 'openid', 'openid_DispName', 'openid_Description', 0);

$$\text{select}@IRId1 = \text{MAX}(Id)\text{ FROM }idm.IdentityResource;$$

DECLARE @IRId2 INT;

INSERT INTO idm.IdentityResource (Enabled, Name, DisplayName, Description, ShowInDiscoveryDocument)

VALUES(1, 'profile', 'profile_DispName', 'profile_Description', 0);

$$\text{select}@IRId2 = \text{MAX}(Id)\text{ FROM }idm.IdentityResource;$$

The following script can be used for creating an identity resource claim:

INSERT INTO idm.IdentityResourceClaim (IdentityResourceId, UserClaim)

VALUES (@IRId1, 'sub');

INSERT INTO idm.IdentityResourceClaim (IdentityResourceId, UserClaim)

VALUES (@IRId2, 'name'), (@IRId2, 'family_name'), (@IRId2, 'given_name'), (@IRId2, 'middle_name'), (@IRId2, 'nickname'), (@IRId2, 'preferred_username'), (@IRId2, 'profile'), (@IRId2, 'picture'), (@IRId2, 'website'), (@IRId2, 'gender'), (@IRId2, 'birthdate'), (@IRId2, 'zoneinfo'), (@IRId2, 'locale'), (@IRId2, 'updated_at');

Within the exemplary system, "scope" is defined in order to limit an application's access to the account of a user. An application may request one or more scopes during operation of the system. An access token that is issued to the application by the HIDM server 34 will be limited to the scopes that are granted to the application. Scopes along with their scope claims must be created and is later mapped to their respective clients. The following script can be used to create scopes:

DECLARE @ScopeId1 INT;

INSERT INTO idm.[Scope] (Enabled, Name, DisplayName, Description, ShowInDiscoveryDocument)

VALUES(1, 'api2', 'api2_DisplayName', 'api2_Description', 1);

$$\text{select}@ScopeId1 = \text{MAX}(Id)\text{ FROM }idm.IdentityResource;$$

DECLARE @ScopeId2 INT;

INSERT INTO idm.[Scope] (Enabled, Name, DisplayName, Description, Show InDiscoveryDocument)

VALUES(1, 'api3', 'api3_HIDMScope', 'api3_Description', 1);

$$\text{select}@ScopeId2 = \text{MAX}(Id)\text{ FROM }idm.IdentityResource;$$

The following script can be used to create scope claims:

INSERT INTO idm.ScopeClaim (UserClaim, ScopeId)

VALUES('businessUnitId', @ScopeId1), ('applicationId', @ScopeId1), ('applicationName', @ScopeId1), ('businessUnitLevel', @ScopeId1), ('businessUnitStatus', @ScopeId1), ('businessUnitName', @ScopeId1), ('roleId', @ScopeId1), ('role', @ScopeId1), ('email', @ScopeId1), ('name', @ScopeId1), ('fullName', @ScopeId1);

INSERT INTO idm.ScopeClaim (UserClaim, ScopeId)

VALUES('businessUnitId', @ScopeId2), ('applicationId', @ScopeId2), ('applicationName', @ScopeId2), ('businessUnitStatus', @ScopeId2), ('businessUnitName', @ScopeId2);

Within the exemplary system, a "protected resource" can include any protected data or functionality. A protected resource can be created along with associated "protected resource claims" and mapped to their respective scopes as required. The following script can be utilized for creation of protected resource and to link them with protected resource claims as well as protected resource scopes:

DECLARE @PRId1 INT;

INSERT INTO idm.ProtectedResource (Enabled, Name, DisplayName, Description)

VALUES(1, 'HIDMPR', 'HIDMPR_DisplayName', 'HIDMPR_Description');

$$\text{select}@PRId1 = \text{MAX}(Id)\text{ FROM }idm.ProtectedResources;$$

DECLARE @PRId2 INT;

INSERT INTO idm.ProtectedResource (Enabled, Name, DisplayName, Description)

VALUES(1, 'api', 'api_DisplayName', 'api_Description');

$$\text{select}@PRId2 = \text{MAX}(Id)\text{ FROM }idm.ProtectedResources;$$

The following script can be utilized for creation of a protected resource claim:

INSERT INTO idm.ProtectedResourceClaim (ProtectedResourceId, UserClaim)

VALUES (@PRId1, 'role'), (@PRId1, 'roleId');

Creation and Linking of ProtectedResourceScopes-

INSERT INTO idm.ProtectedResourceScope
(ScopeId, ProtectedResourceId)
VALUES(@ScopeId2, @PRId1), (@ScopeId1,@PRId2);

Applications are clients of the exemplary system. Applications can request tokens from the HIDM server 34 and use the tokens to access data. An application registered with the HIDM server 34 can itself have multiple clients, including, by way of example and not limitation, FCx_Desktop, FCx_Mobile, etc. To use the HIDM server 34, each application-client must be registered with the HIDM server 34 along with its client claims, client features, grant Type-supported, application-role mapping, and scope mapping as well. The script below can be utilized for the creation of a client and for linking the client to claims and features:

DECLARE @ClientId INT
INSERT INTO idm.Client (Enabled, Name, Description, ClientUri, LogoUri, Allow AccessTokens ViaBrowser, Access TokenType, IdentityTokenLifetime, AccessTokenLifetime, AuthorizationCodeLifetime, AbsoluteRefreshTokenLifetime, SlidingRefreshTokenLifetime, RefreshTokenExpiration, RefreshTokenUsage, UpdateAccessTokenOnRefresh, EnableLocalLogin, IncludeJwtId, SendClientClaims, PrefixClientClaims, LogoutUri, AlwaysIncludeUserClaimsInIdToken, RequirePkce) VALUES (1, 'HIDM_POS', 'HIDM-POS_Description', '', '', 1, 0, 10000, 10000, 10000, 10000, 10000, 1, 0, 0, 1, 0, 1, 1, 'TestClient2_LogoutUri',0,1);

$$\text{select}@\mathit{ClientId} = \text{MAX}(\mathit{Id})\ \text{FROM}\ \mathit{idm.Client};$$

INSERT INTO idm.ClientClaim
(ClientId, [Type], Value)
VALUES (@ClientId, 'Role', 'TestAdmin');

The script below can be utilized for redirecting a uniform resource identifier (URI):

INSERT INTO idm.ClientRedirectUri (ClientId, Uri)
VALUES (@ClientId, 'https://localhost: 5005/signin-oidc');

The script below can be utilized for redirecting a logout URI:

INSERT INTO idm.ClientLogoutRedirectUri (ClientId, Uri)
VALUES (@ClientId, 'https://localhost: 5005/signout-callback-oidc');

The script below can be utilized for defining a client secret:

INSERT INTO idm.ClientSecret(ClientId, Value, [Type], Description, Expiration)
VALUES (@ClientId, 'K7gNU3sdo+OL0wNhqoVWhr3g6s1xYv72ol/pe/Unols=', 'SharedSecret', 'SharedSecret', CONVERT (DATE, '2024-12-31')), The script below can be utilized for creating a client grant type:

INSERT INTO idm.ClientGrantType (ClientId, GrantType)
VALUES (@ClientId, 'client_credentials'), (@ClientId, 'authorization_code');

The script below can be utilized for creating and defining client claims:

INSERT INTO [idm].[ClientClaim]
(ClientId, Type, Value)
VALUES
(@ClientId, 'role', @RoleName),
(@ClientId, 'tenant', @TenantName);

The script below can be utilized for creating and defining client features:

INSERT INTO idm.ClientFeatures (ClientId, Feature, Value)
VALUES (@ClientId, 'ShowBusinessUnitSelection', 'TRUE'), (@ClientId, 'ShowOnScreenKeyboard', 'FALSE');

The script below can be utilized for defining client scope:

INSERT INTO idm.ClientScope (ClientId, ScopeName, ScopeType)
VALUES (@ClientId, 'openid', 3), (@ClientId, 'profile', 3), (@ClientId, 'TestIR1', 3), (@ClientId, 'api3', 1);

Supported Enum Scope Type: 1=Scope; 2=ProtectedResource 3; =IdentityResource

The script below can be utilized for defining a client insert:

INSERT INTO [idm].[Client]
(Id, Enabled, Name, Description, ExternalId, ApplicationId, ClientUri, LogoUri, Allow AccessTokens ViaBrowser, AccessTokenType,
IdentityTokenLifetime, AccessTokenLifetime, AuthorizationCodeLifetime, AbsoluteRefreshTokenLifetime, SlidingRefreshTokenLifetime,
RefreshTokenExpiration, RefreshTokenUsage, UpdateAccessTokenOnRefresh, EnableLocalLogin, IncludeJwtId, SendClientClaims,
PrefixClientClaims, LogoutUri, AlwaysIncludeUserClaimsInIdToken, RequirePkce, AllowOfflineAccess, IsMFAEnabled)
VALUES
(@Id, 1, CONCAT (@TenantName, '_HIDM_UI'), 'HIDM Admin Portal', ", @ApplicationId,", ", 1, 0, 900, 900, 300, 10000, 10000, 0, 0, 0, 1, 0, 1, 0,", 1, 1, 1, 0);

Users of the exemplary system 14 who access the applications 24-32 can register with HIDM server 34 and provide identity details. A user can be initially assigned to at least one application, at least one business unit, and at least one role. The role can be created using the SQL DB. The script below can be utilized to create a user:

DECLARE @userId INT
INSERT INTO [idm].[User]
(SignOnName, Locale, CountryCode, ExternalId, EffectiveDate, ExpirationDate, PasswordEffectiveDate, PasswordExpirationDate,
PasswordResetFlag, PasswordChangeFlag, PasswordEntryErrorCount, SignOnPasswordHash, SignOnPasswordSalt, SignOnPasswordWorkFactor,
Email, PhoneNumber, LogoUrl, FirstName, LastName, IsActive, IsLocked, IsDeleted, DeletionDateTimeUtc, UserRegistrationTypeId)
VALUES ('HIDMAdmin', NULL, NULL, NULL, GETDATE( ), NULL, GETDATE( ), DATEADD(year, 1, GETDATE( )), 0, 0, 0,
N'aVKNKvUZ87tn7FC5RGD+60iMLubUVOqh/OFOLTrIg8E=',
N'a1Nk9SJss9zknIzboa1C4RABNMgoVpf+bHHHgePlygUgonfahUt9wx5cZmEhKD06JsQCM9HeDy+u5qegAJ+MZA==',
100000, NULL, NULL, NULL, 'Admin', 'User', 1, 0, 0, NULL, 1);

$$\text{SELECT}@\mathit{userId} = \text{MAX}(\mathit{Id})\ \text{FROM}\ \mathit{idm.User}$$

The exemplary HIDM server 34 includes a backend end for SPA. The backend provides several benefits. First, the token need not be stored in a browser. Second, authentication/authorization responsibilities are offloaded from the frontend to backend, greatly simplifying the frontend. Third, authorization grant flow with client credentials can be used wherein the frontend acts as a public client and the backend acts as confidential client (having a secret). Fourth, this provides an added layer of security, wherein iDP is able to trust the backend client doing the token exchange.

Figure 3:
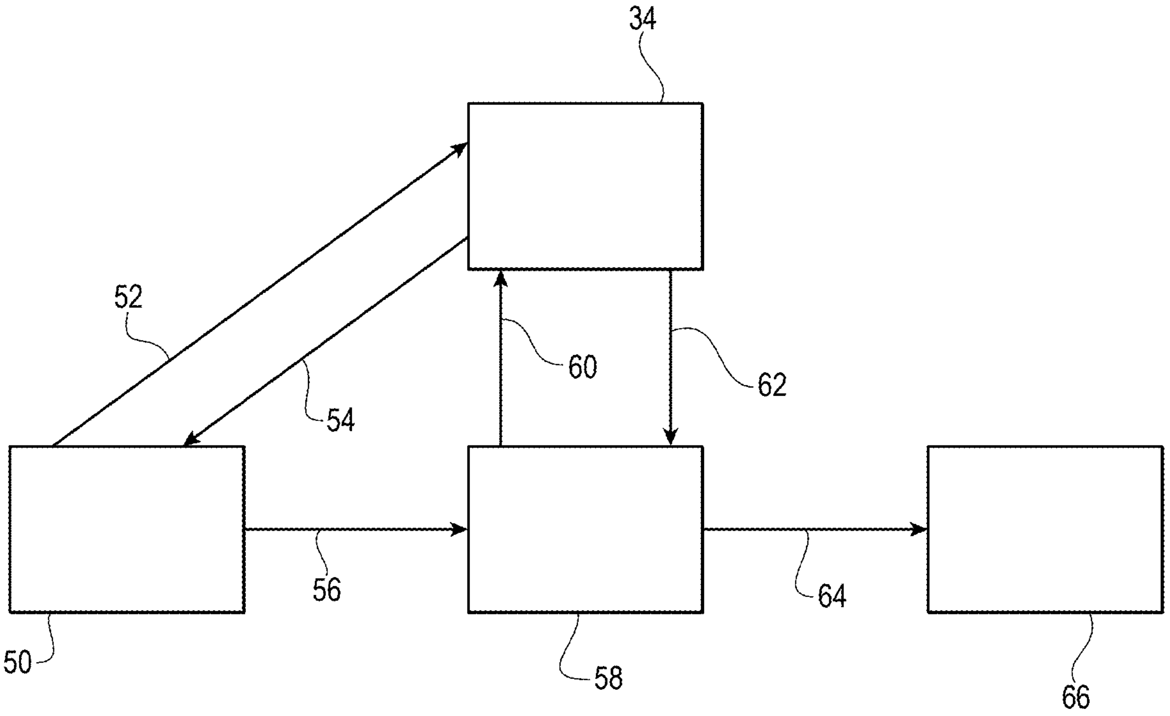
FIG. 3 is a schematic showing the exchange of a token for a replacement token.

In one or more exemplary embodiments of the present disclosure, token exchange flow can be set-up and implemented such that an OAuth resource server assumes the role of the client during the exchange. Referring now to FIG. 3, a client, such as one of servers 24-32, calls the HIDM server 34 to request a token. This call is referenced by 52. In response, as referenced by 54, the HIDM server 34 returns or transmits an access token to the client 52. At 56, the client 50 calls an OAuth resource server 58 with the token received from the HIDM server 34. The OAuth resource server 58 then, at 60, transmits the initial token that it received from the client 50 in a protected resource request to the HIDM server 34, to trade the initial token for another token. At 62, the HIDM server 34 transmits an exchanged token to the OAuth resource server 58. At 64, the OAuth resource server 58 call a resource or backend service 66 that holds the desired data. The OAuth resource server 58 will receive the desired data from the backend service 66 and transmit the data to the client 50.

Exemplary script for a request for a token exchange call is set forth below:

POST/token HTTP/1.1 Host: as.example.com

Authorization: Basic {base64(clientId:clientSecret)}

Content-Type: application/x-www-form-urlencoded grant_type=urn: ietf: params: oauth: grant-type: token-exchange &subject_token=<valid_access_token> &subject_token_type=urn: ietf: params: oauth: token-type: access_token &audience={logicalTargetName} &scope={oauthScope}

Exemplary script for a request for a token exchange call is set forth below:

```
{
“access__token” : {JWT access token},
“token__type” : “Bearer”,
“expires__in” : 300, // recommended lifetime in seconds
“scope” : “{granted-scope}”, // required if not identical as associated
with given securijwtty token
“refresh__token” : {JWT Refresh Token},
“issued__token__type”:
“urn:ietf:params:oauth:token-type:access__token”
}
```

Parameters for a request for a token exchange call can include:

| Request Parameter | Necessity | Description | Comments |
|---|---|---|---|
| grant_type | REQUIRED | The value urn : ietf : params :oauth :grant - type : token-Exchange indicates that the token request is a token exchange request. | |
| subject_token | REQUIRED | The value of the subject token. | We can add access token or id token or refresh token. Currently just access token is supported. |
| subject_token_type | REQUIRED | The token type of the subject token. One of the registered token type identifiers. | urn:ief:params:oauth:token-type:access_token (OidcConstants. TokenTypeIdentifiers are supported by OAuth. We are only supporting Access token currently) |
| exchange_style | REQUIRED | Type of token exchange flow i.e. impersonation and delegation | This is a custom required field and not an OAuth standard |
| Audience | OPTIONAL | Audience of the newly issued token. This request parameter also may be specified multiple times. | |
| Scope | OPTIONAL | A list of space-delimited names of scopes that are to be tied to the newly issued token. | |

Parameters for a response to a token exchange call:

| Response Parameter | Necessity | Description |
|---|---|---|
| access_token | REQUIRED | Regardless of the token type, the value of the newly issued token is set to this response parameter. |
| issued_token_type | REQUIRED | The token type of the newly issued token. One of the registered token type identifier. |
| token_type | REQUIRED | When the token type of the newly issued token is urn : ietf : params : oauth : token-type : access_token, this response parameter has the same meaning as defined in RFC 6749 The OAuth 2.0 Authorization Framework. In other cases, “N_A” is set. |
| expires_in | OPTIONAL | The lifetime of the newly issued token in seconds. |
| Scope | OPTIONAL | Scopes tied to the newly issues token. When the actual set of scopes tied to the newly issued token is different from the set requested by the token exchange request, this response parameter is REQUIRED. |
| refresh_token | OPTIONAL | A refresh token |

The HIDM server 34 is configured to implement two kinds of token exchange flows: delegation flow and impersonation flow. Delegation flow enables client applications to act on behalf of a different entity, for example client 24 can act on behalf of client 26. The exemplary content below content can be decrypted from an exchanged access token:

```
{
"iss": "https://hidm.mtdev1-
weu.hidm.nextgen.dieboldnixdorf.com/authenticationservice",
"nbf": 1668765542,
"iat": 1668765542,
"exp": 1668769142,
"scope": [
"api1",
"offline_access"
],
"amr": [
"urn:ietf:params:oauth:grant-type:token-exchange"
],
"client_id": "Client A",
"sub": "1",
"auth_time": 1668765542,
"idp": "local",
"act": {
"client_id": "Client B"
},
"jti": "080B2817A59D263BA4643FBB7A11CF22"
}
```

The component below is the only major difference between a delegation flow and an impersonation flow:

```
"act": {
"client_id": "Client B"
}
```

Impersonation flow enables a privileged user to log into a client application under a different identity. The content below can be decrypted from an exchanged access token:

```
{
"iss": "https://hidm.mtdev1-
weu.hidm.nextgen.dieboldnixdorf.com/authenticationservice",
"nbf": 1668765542,
"iat": 1668765542,
"exp": 1668769142,
"scope": [
"api1",
"offline_access"
],
"amr": [
"urn:ietf:params:oauth:grant-type:token-exchange"
],
"client_id": "Client A",
"sub": "1",
```

-continued

```
"auth_time": 1668765542,
"idp": "local",
"jti": "080B2817A59D263BA4643FBB7A11CF22"
}
```

A resource owner password credentials (ROPC) flow allows exchanging the username and password of a user for an access token. ROPC can be a very straightforward request and response flow unlike other, standard OAuth flows. The client can simply make a call to the token endpoint of the HIDM server 34 and get the required tokens in the response. ROPC can be used with highly-trusted applications to provide active authentication. This authentication mechanism does not redirect users to Auth0. It authenticates users with a single request, exchanging their password credentials for a token. The ROPC grant allows resource owners to provide trusted clients with their credentials, which the clients can further use to obtain an access token. Clients use the access token to access resources on the resource server.

During ROPC flow, the resource owner provides the user credentials to the client. The client then connects to the HIDM server 34 through the token endpoint. The client can send the following parameters in the request body:

| Parameter | Description | Necessity |
|---|---|---|
| Username | Username of the Resource Owner | Mandatory |
| Password | Password of the Resource Owner | Mandatory |
| client_id | Client Id | Mandatory |
| client_secret | Client Secret (optional if the Public Client flag is enabled for the particular client.) | Optional |
| grant_type | password | Mandatory |
| Scope | Scopes associated | Optional |
| acr_values | Ex: applicationId: 1 businessunitld: 1 (custom implementation) | Mandatory (Custom implementation) |

The HIDM server 34 can include a Nuget package that provides permissions for a particular role for the application. The configuration properties for the permission in a library are added by the client host application. The host application can add the following section in its configuration file:

```
"AuthorizationLibraryConfig": {
"TenantShortName": "tenant1",
"ApplicationName": "HIDM",
"CouchDBServer": "https://couchdb-hidm-dev1-
weu.hidm.nextgen.dieboldnixdorf.com/",
"CouchDBUserName": "admin",
"CouchDBPassword": "2D4hY3dJlOl6mvlCegeAOkxxxxxxxxxxx",
"RedisConnectionString":
"localhost:9100,syncTimeout=8000,abortConnect=false,connectTimeout=10000,password=m0gjm
DcqSyVHxvebIgk2XSxxxxxxxxxx",
"ConnectionMode": "online"
}
```

Next, the client application can register the DI using an AddAuthLibraryDependencies( ) extension method on service collection. The Authorization library will expose the methods below:

| Methods | Params | Possible Errors |
|---|---|---|
| GetClientRolePermissionsDataAsync | (string roleName) | Role name can not be null of empty<br>Application name is not configured<br>Tenant short name is not configured |
| GetClientRolePermissionsDataAsync | (string tenantShortName, string roleName) | Role name can not be null of empty<br>Application name is not configured<br>Tenant short name is not configured |
| GetClientRolePermissionsDataAsync | (string roleName) | Role name can not be null of empty<br>Application name is not configured<br>Tenant short name is not configured |
| GetClientRolePermissionsDataAsync | (string tenantShortName, string roleName) | Role name can not be null of empty<br>Application name is not configured<br>Tenant short name is not configured |

The resultant permissions are returned in the following format:

```
{
"apiResources" :[
{
"apiVerb" : "",
"apiRegister" : ""
}
],
"functionResources" :[
{
"function" : "",
"action" : ""
}
]
}
```

In the case of Redis, the RoleName is first searched against the configured application name in the Redis DB, if it is not found, it is searched against the global roles.

The authorization library can be configured to work both in an online mode and an offline mode. In the case of the online mode, redis connection details are mandatory. In the case of the offline mode, CouchDB connection details are mandatory.

Once all the pre-requisites for client registration with the HIDM server 34 are complete, the following events can be performed when a user attempts to access an application. First, a user registered with a client application will attempt to log into the application through the applicable URL. Next, the user can be redirected to a central login page of the HIDM server 34; the user can then provide the registered username and password. If the user provides valid credentials, an authorization code is generated by the HIDM server 34 and provided to the user. This authorization code can be reused and revalidated for the generation of access and identity tokens.

Next, the user can be redirected to the application that he/she intended to access. Based on the roles returned in the access token, the user would be able to access the intended application pages/features and would be able to view/create/modify the content of that particular page or feature. An identity token represents the outcome of the authentication process. It contains, minimally, an identifier for the user (called the subject claim) and information about how and when the user is authenticated. It can contain additional identity data. An access token allows access to an API resource. Clients request access tokens and forward them to the API. Access tokens contain information about the client and the user (if present). APIs use that information to authorize access to their data.

The HIDM server 34 can also provides a programmatic way to delete all data associated with a given user when a user requests deletion of their data from HIDM, known as the right to be forgotten.

The HIDM server 34 can also apply a multi-factor authentication (MFA) protocol. The HIDM server 34 can also enforce using an MFA factor like an authentication key, which implies increased confidence that your application will stay safe from cyber criminals.

The HIDM server 34 can be configured to support a user interface in multiple languages on its login screens.

The HIDM server 34 can be hosted as a cloud service. However, if POS machines located at individual stores experience issues like network latency, they may need offline support. Hence, the HIDM server 34 can be made available offline to be used on the on-premises edge server that is located in individual stores. In this case, HIDM is said to be working in Offline mode.

The edge server is setup with the POS services and is synced with the cloud set-up so that the data and the configurations is always up-to-date. The POS is configured such that it automatically connects with the edge when there is any issue connecting to the cloud. The POS can send request and receive responses from the edge server similar to connecting with the cloud.

The HIDM Architecture enables offline/on premises/edge based authentication. When the authentication service is deployed to an edge server of a retail store, all the data related to authentication can be replicated from the cloud instance of CouchDb to local/edge instance of CouchDb. The mode the operation is configured by the environment variable "OperatingMode."

Figure 4:
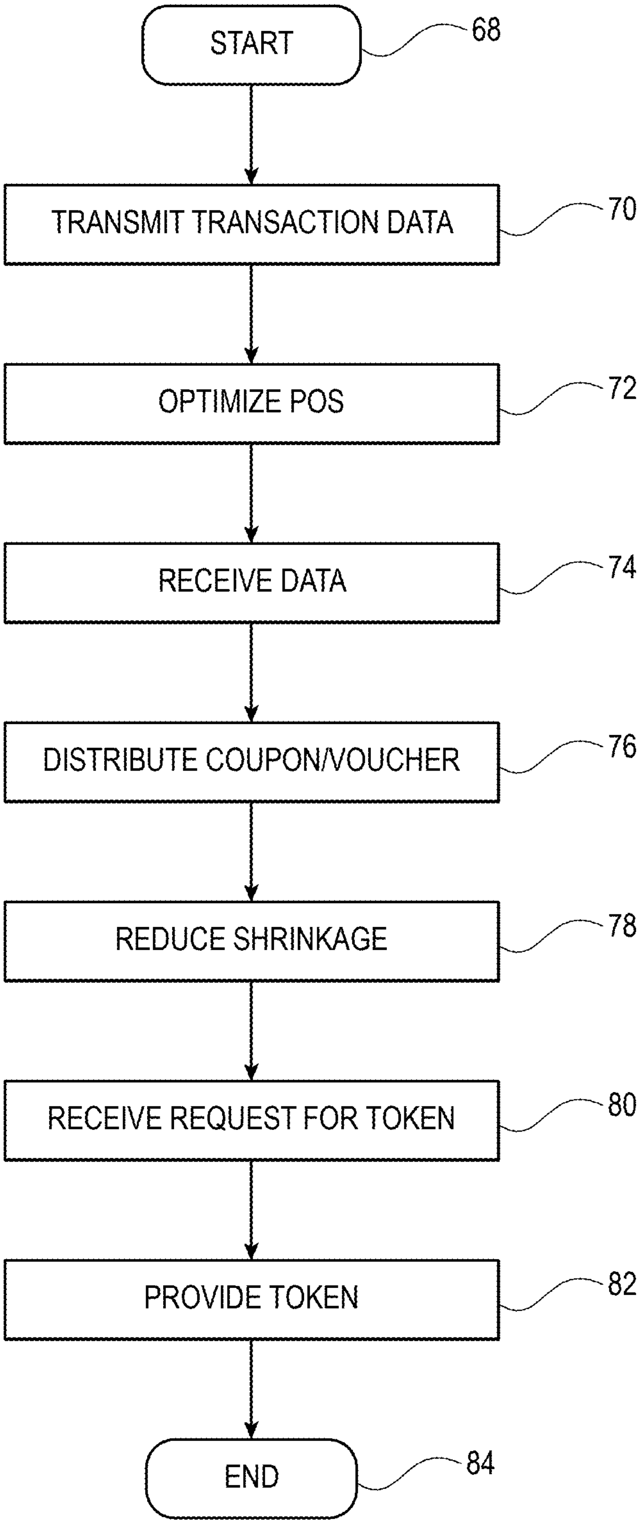
FIG. 4 is a simplified flow diagram of an exemplary process performed by one or more embodiments of the present disclosure.

FIG. 4 is a simplified flow diagram of an exemplary process performed by one or more embodiments of the present disclosure. The process starts at 68. At 70, data associated with a transaction can be transmitted with a point of sale ("POS") device, such as POS device 20. The data can be transmitted to a payment server, such as payment server 24. The payment server can assess the transaction data and determine if the account associated with the transaction has sufficient resources to fulfill the amount of the transaction. The data can thus be transmitted to gain approval of the transaction.

At 72, a device monitoring server can optimize the performance of the POS device, such as POS device 20. The device monitoring server can be configured to communicate with the POS device 20 over the network 22. The POS device can be optimized by in various ways, including updating software and data.

At 74, a customer engagement server, such as server 28, can also receive the data associated with the transaction. At 76, the customer engagement server can distribute a coupon or a voucher to the customer that is associated with the transaction. The coupon or voucher can be based on the data associated with the transaction. For example, if the transaction involves a first piece of furniture, the customer engagement server can distribute a coupon for a second piece of furniture that is complementary to the first piece of furniture.

At 78, a checkout assistance server, such as server 30, can reduce shrinkage associated with unexpected items in a bagging area near the POS device. The checkout assistance server can be configured to communicate with the POS device during the completion of the transaction over the network.

At 80, an HIDM server, such as server 34, can receive requests for authorization tokens. Respective requests can be received from the payment server, the device monitoring server, the customer engagement server, and the checkout assistance server. Each authorization token provides access to protected resources. At 82, the HIDM server can provide authorization tokens in response to the respective requests. The process ends at 84.

What has been described above includes examples of the subject innovation. It is, of course, not possible to describe every conceivable combination of components or methodologies for purposes of describing the disclosed subject matter, but many further combinations and permutations of the subject innovation are possible. The use of any and all examples, or exemplary language (e.g., "such as") provided herein is intended merely to be illustrative and does not pose a limitation on the scope of any innovation disclosed herein unless otherwise claimed. The word "exemplary" is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete fashion. Further, any statements set forth within the Detailed Description of this document and addressing a prior art device(s) are the observations of the inventor and such statements themselves are not prior art or admissions as to what is prior art.

A "service," as used herein, includes logic but is not limited to hardware, firmware, software and/or combinations of each to perform a function(s) or an action(s), and/or to cause a function or action from another component. For example, based on a desired application or need, a service applying logic may include a software-controlled microprocessor, discrete logic such as an application specific integrated circuit (ASIC), a programmable/programmed logic device, memory device containing instructions, or the like, or combinational logic embodied in hardware. Logic for performing a service may also be fully embodied as software that performs the desired functionality when executed by a processor.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements. Use of the terms "about" or "approximately" are intended to cover values that are above and/or below a stated value or range, or within manufacturing tolerances, as would be understood by one having ordinary skill in the art in the respective context. In some instances, this may encompass values in a range of approx. +/−10%; in other instances, there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context. Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein. Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted, unless expressly contradicted by the text herein or context.

While the present disclosure has been described with reference to one or more exemplary embodiments, it is to be understood that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to a particular embodiment disclosed herein as the best mode contemplated for carrying out this present disclosure, but that the present disclosure will be viewed as covering any embodiment falling within the scope of the appended claims. Various aspects or features described herein may be implemented as a method, apparatus, or article of manufacture using standard programming and/or engineering techniques.

Also, the right to claim for patent coverage a particular sub-feature, a sub-component, or a sub-element of any disclosed embodiment, singularly or in one or more sub-combinations with any other sub-feature(s), sub-component (s), or sub-element(s), is hereby unconditionally reserved by the Applicant. Also, particular sub-feature(s), sub-component(s), and sub-element(s) of one embodiment that is disclosed herein can replace particular sub-features, sub-components, and sub-elements of another embodiment disclosed herein or can supplement and be added to another embodiment unless expressly indicated otherwise by the drawings or this specification. The inventor also asserts that any of the claims set forth after this detailed description can be combined with any other claim or claims regardless of whether or not there is a direct line of dependency, unless there is an express indication in this text or the drawings unambiguously indicating that such a combination is not possible. The order of the claims and the lines of dependency are irrelevant to the various ways that the features, elements, sub-elements, components, sub-components, etc. of the present disclosure can be combined and thus claimed. Further, the use of the word "can" in this document is not an assertion that the subject preceding the word "can" is unimportant or unnecessary or "not critical" relative to anything else in this document. The word "can" is used herein in a positive and affirming sense and no other motive should be presumed. More than one patentable "invention" may be disclosed in the present disclosure and it is noted that an "invention" is defined by the content of a patent claim and not by the content of descriptive text or drawings.

What is claimed is:

1. A system for processing transactions comprising:

a point of sale ("POS") device configured to transmit data associated with a transaction to gain approval of the transaction initiated by a customer;

a payment server configured to communicate with said POS device during a completion of the transaction over a network and receive the data associated with the transaction and further configured to transmit approval of the transaction to said POS device over the network;

a device monitoring server configured to communicate with said POS device over the network and monitor and optimize a performance of said POS device;

a customer engagement server configured to communicate with said POS device during the completion of the transaction over the network, to receive data associated with the transaction and advance at least one promotion to a customer requesting the transaction, and configured to track a loyalty plan with rewards associated with the customer, and configured to distribute at least one of a coupon and a voucher based on the data associated with the transaction;

a checkout assistance server configured to communicate with said POS device during the completion of the transaction over the network and reduce shrinkage associated with unexpected items in a bagging area near said POS device; and a Harmonized Identity Management ("HIDM") server configured to receive respective requests for authorization tokens from all of said payment server, said device monitoring server, said customer engagement server, and said checkout assistance server, each of the authorization tokens providing access to protected resources, said HIDM server configured to provide the authorization tokens in response to the respective requests.

2. The system of claim 1 wherein said HIDM server utilizes OAuth2/OIDC protocols in responding to the respective requests.

3. The system of claim 1 wherein said HIDM server further comprises:

a management service module configured to expose Create, Read, Update, and Delete (CRUD) application programming interfaces (APIs) for different entities utilizing said HIDM server.

4. The system of claim 3 further comprising:

a database accessible by said HIDM server, wherein said management service module is configured to provide separate portions of said database for said payment server, said device monitoring server, said customer engagement server, and said checkout assistance server.

5. The system of claim 1 wherein said HIDM server further comprises:

an authentication service module configured to expose openID based end points for authentication.

6. The system of claim 5 wherein said authentication service module is further configured to provide separate CouchDB databases for each of said payment server, said device monitoring server, said customer engagement server, and said checkout assistance server.

7. The system of claim 1 wherein said HIDM server further comprises:

at least one Redis-Sync service module configured to replicate data.

8. The system of claim 7 wherein said at least one Redis-Sync service module is further defined as:

a plurality of Redis-Sync service modules, each deployed for one of said payment server, said device monitoring server, said customer engagement server, and said checkout assistance server.

9. The system of claim 1 wherein said HIDM server further comprises:

at least one CouchDB-Sync service module configured to synchronize data specific to one of said payment server, said device monitoring server, said customer engagement server, and said checkout assistance server between a SQL database to a CouchDB.

10. The system of claim 9 wherein said at least one CouchDB-Sync service module is further defined as:

a plurality of CouchDB-Sync service modules, each deployed for one of said payment server, said device monitoring server, said customer engagement server, and said checkout assistance server.

11. A method of operating a system for processing transactions comprising:

transmitting data associated with a transaction, with the POS device, to a payment server, over a network, wherein the payment server is configured to transmit approval of the transaction to the POS device over the network;

optimizing a performance of the POS device with a device monitoring server configured to communicate with the POS device over the network;

receiving the data associated with the transaction with a customer engagement server;

distributing, with the customer engagement server, at least one of a coupon and a voucher to the customer associated with the transaction based on the data associated with the transaction;

reducing shrinkage associated with unexpected items in a bagging area near the POS device with a checkout assistance server that is configured to communicate with the POS device during the completion of the transaction over the network;

receiving, with a Harmonized Identity Management ("HIDM") server, respective requests for authorization tokens from all of the payment server, the device monitoring server, the customer engagement server, and the checkout assistance server, wherein each of the authorization tokens provide access to protected resources; and providing, with the HIDM server, the authorization tokens in response to the respective requests.

12. The method of claim 11 further comprising:

utilizing, with the HIDM server, OAuth2/OIDC protocols in responding to the respective requests.

13. The method of claim 11 wherein said receiving is further defined as:

receiving, with the HIDM server, the respective requests for authorization tokens wherein at least one of the respective requests is received by way of a delegation flow whereby the at least one of the respective requests is received from one of the payment server, the device monitoring server, the customer engagement server, and the checkout assistance server on behalf of another of the payment server, the device monitoring server, the customer engagement server, and the checkout assistance server.

14. The method of claim 11 further comprising:

receiving, with the HIDM server, a right-to-be-forgotten request from a user to delete all data associated with the user; and deleting, with the HIDM server, all of the data associated with the user in response to said receiving the right-to-be-forgotten request.

15. The method of claim 11 further comprising:

exposing, with an authentication service module of the HIDM server, openID based end points for authentication.

16. The method of claim 11 further comprising:

deploying, from within the HIDM server, a CouchDB-Sync service module for each the payment server, the device monitoring server, the customer engagement server, and the checkout assistance server.

17. The method of claim 11 further comprising:

deploying, from within the HIDM server, a Redis-Sync service module for each of the payment server, the device monitoring server, the customer engagement server, and the checkout assistance server.

18. The method of claim 11 further comprising:

hosting the HIDM server as a cloud service.

* * * * *